United States Patent [19]

Hsu et al.

[11] Patent Number: 4,946,228
[45] Date of Patent: Aug. 7, 1990

[54] DEVICE FOR FASTENING A WHEEL COVER

[76] Inventors: Tung-Fu Hsu, 70, Cheng Tze Lias, Chunkung Li, Tainan, Taiwan; Mark J. Plumer, 13010 South Broadway, Los Angeles, Calif. 90061

[21] Appl. No.: 378,054

[22] Filed: Jul. 11, 1989

[51] Int. Cl.$^5$ .............................................. B60B 7/06
[52] U.S. Cl. ................... 301/37 S; 301/108 S
[58] Field of Search ............... 301/37 R, 37 S, 108 R, 301/108 S

[56] References Cited

U.S. PATENT DOCUMENTS

| 4,240,670 | 12/1980 | Zorn et al. | 301/9 DN |
| 4,606,582 | 8/1986 | Warren | 301/108 S |
| 4,787,681 | 11/1988 | Wang et al. | 301/37 S |

*Primary Examiner*—Russell D. Stormer
*Attorney, Agent, or Firm*—Knobbe, Martens, Olson & Bear

[57] ABSTRACT

A device for mounting on a wheel cover to conceal an exposed end of the axle on which the wheel is mounted. The wheel cover having a plurality of annularly disposed bores formed in the wheel cover comprises an annular mounting plate having a plurality of openings disposed peripherally. The plate being mountable on the axle so that each of the openings can respectively align with the corresponding bore of the wheel cover. The plate having at least a pair of first locking apertures; a plurality of first screw members, each of which passes through each bore and each opening so as to lock the plate on the wheel cover; a hub cover having a plurality of recessed portions, each of which is aligned with the openings and dimensioned slightly larger than an enlarged end of the first screw member so as to receive the each first screw member, and including a pair of holes each of which is positioned to align with the corresponding one of the locking apertures; and a pair of second screw members passing through the hole and the aperture to lock the hub cover to the plate, so that the hub cover may be easily assembled or disassembled.

4 Claims, 3 Drawing Sheets

DEVICE FOR FASTENING A WHEEL COVER

BACKGROUND OF THE INVENTION

The present invention relates to a device for mounting on a wheel cover to conceal the exposed end of the axle on which the wheel is mounted so that the hub cover may be easily assembled or disassembled.

Conventional hub covers which are designed to be mounted on wheel covers are e.g. those shown in FIGS. 1-4. Further improvements and modifications still need to be made on these conventional hub covers due to the disadvantages thereof which will be described respectively follows:

As shown in FIG. 1, a hub cover 14 is mounted on the wheel cover 13 by means of a plurality of nuts 18 and a plurality of recessed portions 19 which cover each of the nuts 18. The assembly and disassembly of the wheel covers of the prior art are difficult and complex.

Referring to FIGS. 2-4, another conventional hub cover 15 is shown which is frictionally engaged with the wheel cover, (as indicated by numeral A). If the hub cover and the wheel cover are assembled and disassembled repeatedly, they may loose and come apart while the vehicle they are connected to is being driven, causing damage to said vehicle, as well as possibly injuring the driver thereof.

Referring to Fig.3, a nut 20 and a screw 21 which are used to fix the wheel cover 22 of the Ford type are provided with two recessed portions 23, 24. Referring to FIG. 4, a nut 25 and a screw 26 which are used to fix the wheel cover 27 of the General Universal are provided with three recessed portions 28, 29, 30. It is noted that the number abovementioned recessed portions varies form type to type. Moreover, the number of said recessed portions are usually greater than two, thus increasing the manufacturing cost.

SUMMARY OF THE PRESENT INVENTION

An object of this invention is to provide a device to be mounted on a cover, which has a simple construction and is easy to assemble or disassemble.

According to the present invention, a device for mounting on a wheel cover to exposed end of the axle on which the wheel is mounted, the wheel cover having a plurality of annularly disposed bores formed therein comprises an annular mounting plate having a plurality of peripherally disposed openings, the plate being mountable on the axle so that each of said openings can respectively align with the corresponding bore of the wheel cover, the plate having at least one pair of first locking apertures; a plurality of first screw members, each of which passes through the each bore and each opening so as to lock the plate on the wheel cover; a hub cover having a plurality of recessed portions, each of which is aligned with said openings and dimensioned slightly larger than an enlarged end of the first screw member so as to be able to receive each first screw member, including a pair of holes each of which is positioned to align with the corresponding one of the locking apertures; and a pair of second screw members passing through the holes and the apertures to lock the hub cover to the plate.

The present invention further includes a washer disposed between the hub cover and the plate, having a plurality of second apertures aligned with the bores.

The hub cover further includes a circumferential portion laterally extending and depending from the peripheral portion thereof, said circumferential portion being made of a flexible material and defining a cylindrical space which is slightly smaller than the periphery of said plate, whereby when said hub cover is locked to said plate, said circumferential portion can be press fit on said periphery of said plate.

BRIEF DESCRIPTION OF DRAWING

Futher objects and advantages of the present invention will be made more apparent by referance to the accompanying drawings in which.

DETAILED DESCRIPTION OF THE PREFERRED EMBODIMENT

Figure 5:
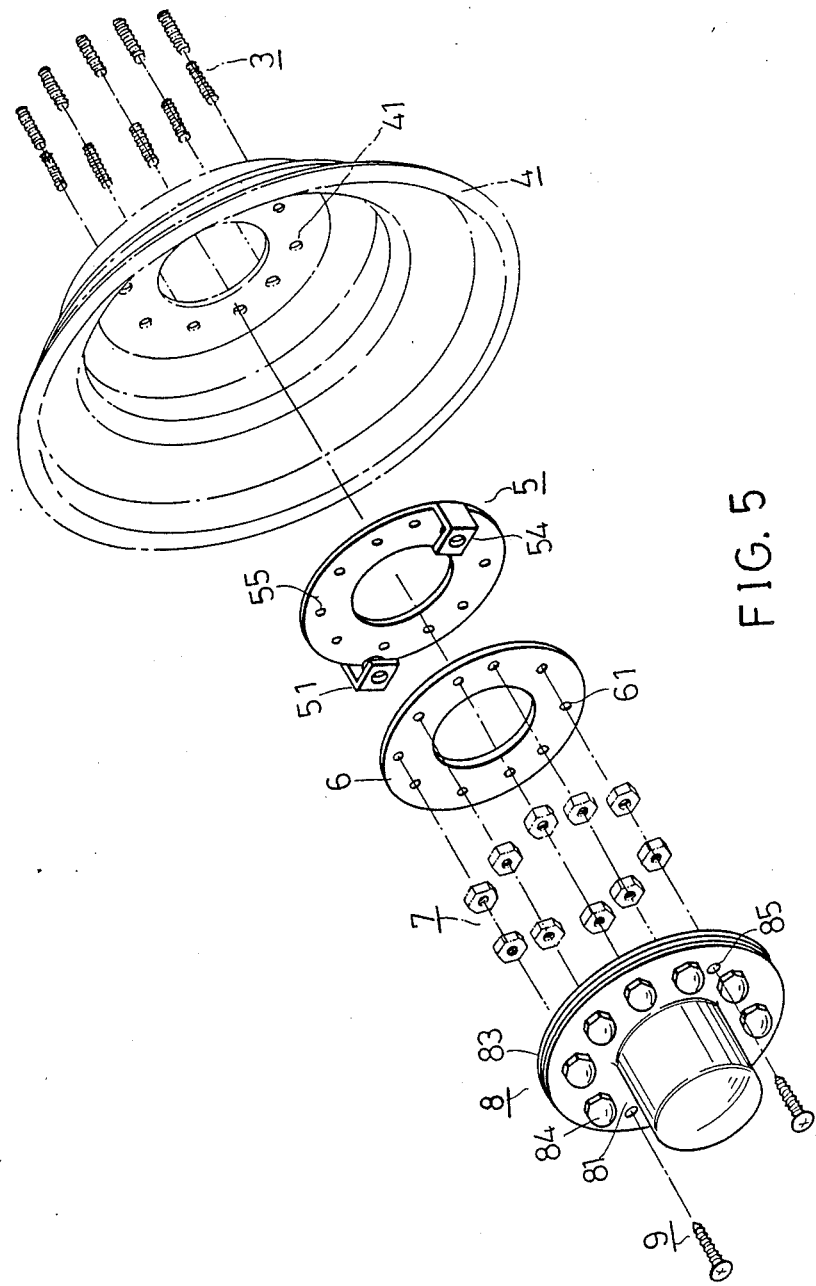
FIG. 5. is an exploded view of the present invention.

Referring now to FIG. 5, an exploded view of a wheel assembly is shown, wherein a wheel cover 4 is a conventional element, and has a plurality of bores 41 formed therein.

The present invention provides a device which can be mounted on a wheel cover 4 to conceal the exposed end of the axle upon which said wheel is mounted (not shown), and which comprises an annular mounting plate 5, a washer 6, a first screw members 3, a hub cover 8 and a pair of second screw members 9. The plate 5 contains a plurality of openings 55 aligned with the bores 41 on the wheel cover 4 and adapted to allow the first screw members 3 to pass therethrough. The plate 5 also contains a pair of bent members 51 on an edge thereof, the bent members 51 each containing a locking aperture 54.

The washer 6 is held adjacent to the plate 5 and contains a plurality of second apertures 61, the second apertures 61 matching with the openings 55 on the plate 5 in order to allow the first members 3 to pass therethrough.

The first screw member 3 penetrates the bores 41, the openings 55 and the second apertures 61 respectively and then by connection with a nut 7, locks the wheel cover 4, the plate 5 and the washer 6 together.

Figure 1:
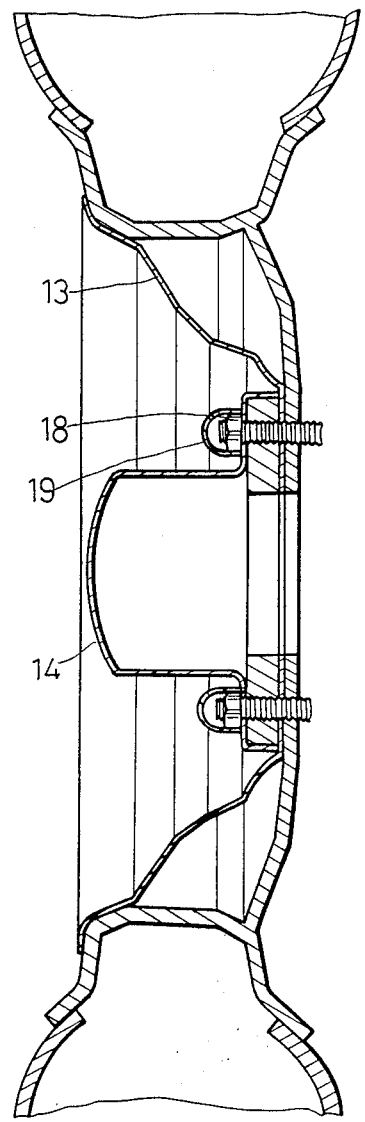
FIG. 1. is a cross-sectional view of the prior art.
Figure 2:
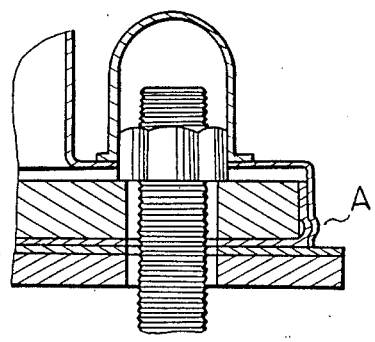
FIG. 2. is a cross-sectional view of the invention of U.S. Pat. No. 4,787,681.
Figure 3:
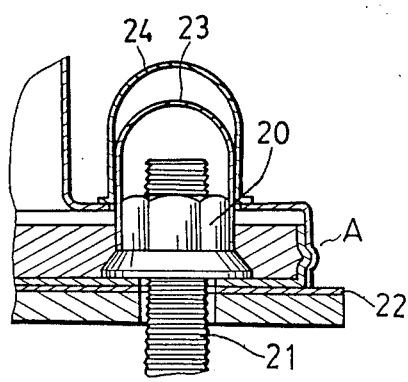
FIG. 3. is a cross-sectional view of the Ford lug nut assembly described in U.S. Pat. No. 4,787,681.
Figure 4:
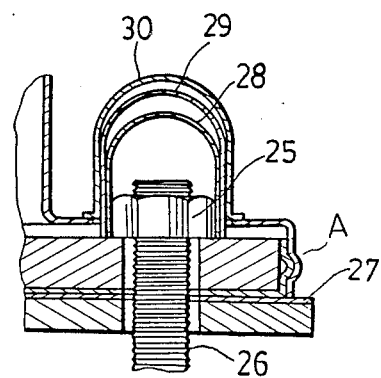
FIG. 4. is a cross-sectional view of the General Universal nut assembly described in U.S. Pat. No. 4,787,681.
Figure 6:
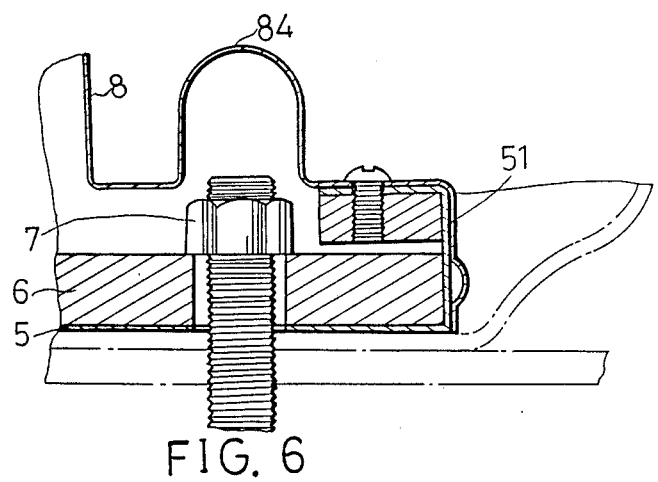
FIG. 6. is a cross-sectional view of the present invention described in U.S. Pat. No. 4,787,681.

The hub cover 8 includes a plurality of recessed portions 84 each of which is aligned with the openings 55 and dimensioned slightly larger than the nuts 7 of the first screw members 3 so as to receive said nuts 7. The hub 8 also includes pair of holes 85, each of which is positioned to align with the corresponding one of the locking apertures 54. In addition, the hub cover 8 includes a circumferential portion 83 laterally extending and depending from the peripheral portion thereof the circumferential portion being made of a flexible material and defining a cylindrical space which is slightly smaller than the periphery of the plate 5 whereby when the hub cover 8 is locked to the plate 5, the circumferential portion can be press fit on the periphery of the plate 5,(see FIG. 6 ).

The second screw members 9 pass through the holes 85 and the apertures 54 to lock the hub cover 8 to the plate 5.

With the invention thus explained, it is apparent that numerous and variation can be made without departing from the scope of the present invention. This invention is therefore intended to be limited only as indicated in the appended claims.

We claim:

1. A device for mounting on a wheel cover to conceal an exposed end of the axle on which said wheel is mounted, said wheel cover having a plurality of annularly disposed bores formed therein, comprising:
    an annular mounting plate having a plurality of openings disposed peripherally, said plate capable of being mounted on said axle so that each of said openings can respectively align with the corresponding bore of said wheel cover, said plate having at least a pair of first locking apertures;
    a plurality of first screw members, each of which passes through each said bore and each said opening so as to lock said plate on said wheel cover with a nut;
    a hub cover having a plurality of recessed portions, each of which is aligned with said openings and dimensioned slightly larger than the nut on the end of each of said first screw members so as to receive and cover a respective one of said first screw members and its corresponding nut, said hub cover also including a pair of holes, each of which is positioned to align with the corresponding one of said locking apertures; and
    a pair of second screw members passing through said hole and said apertures to lock said hub cover to said plate.

2. A device in accordance with claim 1, wherein said pair of apertures are diametrically disposed on said annular plate.

3. A device in accordance with claim 1 further including a 25 washer disosed between said hub cover and plate, having a plurality of second apertures aligned with said bores.

4. A device in accordance with claim 1 wherein said hub cover includes a circumferential portion laterally extending and depending from the peripheral portion thereof, said circumferential portion being made of a flexible material and defining a cylindrical space which is slightly smaller than the periphery of said plate whereby when said hub cover is locked to said plate, said circumferential portion can be press fit on said periphery of said plate.

* * * * *